Jan. 12, 1932. H. J. KAEHLER 1,840,957
MOUTH GUARD FOR ANIMALS
Filed Aug. 21, 1929
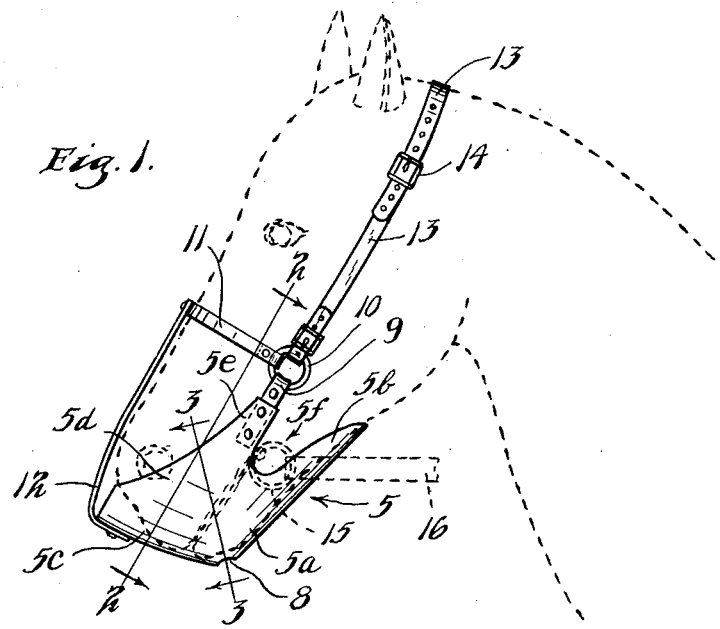
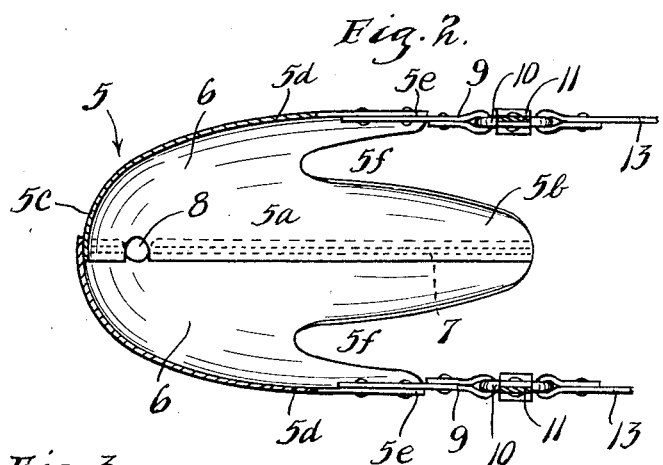
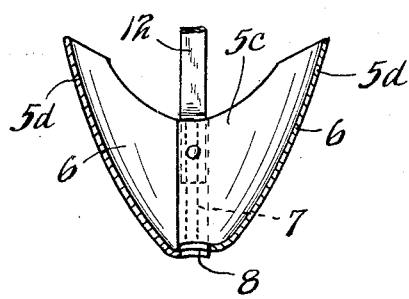
INVENTOR.
H. J. KAEHLER.
BY HIS ATTORNEYS.

Patented Jan. 12, 1932

1,840,957

UNITED STATES PATENT OFFICE

HENRY JOHN KAEHLER, OF WALNUT GROVE, MINNESOTA

MOUTH GUARD FOR ANIMALS

Application filed August 21, 1929. Serial No. 387,365.

This invention relates to a protector for animals and particularly to a guard adapted to extend about the mouth of the animal and to protect the same from certain insects. Some insects and flies, such as the gadfly, attack the mouth or lips of the animal and the sting is quite painful.

It is an object of this invention to provide a simple, inexpensive and yet very efficient guard which will protect the mouth of the animal from insects.

It is a further object of the invention to provide a guard for the mouth of an animal, which guard is made from leather or some similar material and is substantially of bag-like form, the sides converging toward a central point, said member having a projection extending upwardly in the rear of the animal's jaw.

It is a further object of the invention to provide a simple and efficient guard, made of leather or similar material, for the mouth of an animal, said guard to be in the form of a bag of substantially conical form, one side of which extends across the bottom of the mouth and one side of which extends upwardly in the rear of the animal's jaw, said latter side having an upwardly extending projection, the other sides being disposed at the sides of the animal's mouth and having upwardly extending projections forming slots with said first mentioned projection, a drain hole being provided at the central lower portion of the device and said device having means for supporting the same from the head or the bridle of an animal.

These and other objects and advantages of the invention will be fully set forth in the following description made in connection with the accompanying drawings, in which like reference characters refer to similar parts throughout the several views, and in which:—

Fig. 1 is a view in side elevation of the device, the head of the animal wearing the device being shown in dotted lines;

Fig. 2 is a section taken on line 2—2 of Fig. 1 as indicated by the arrows, and

Fig. 3 is a view taken on line 3—3 of Fig. 1 as indicated by the arrows.

Referring to the drawings, a guard 5 is shown, which preferably will be made of leather or similar material. While the parts of the guard might be variously formed, in the embodiment of the invention illustrated it is shown as made from two similar pieces of material 6 connected together by a seam 7 extending along a central longitudinal line of the device. While the guard could be said to have a lower portion, a rear portion and opposite side portions, yet these portions are all connected and merge into each other so that the guard is in the form of a bag-like member of substantially conical shape, the sides all converging toward a point disposed substantially mid-way of seam 7. A single drain hole 8 is formed at said point. The rear portion 5a is disposed at the rear of the lower jaw of the animal as shown in Fig. 1 and this portion has a projection 5b which extends upwardly quite a distance at the rear of the said jaw. The lower portion 5c is disposed below the animal's mouth and the side portions 5d extend at the sides of the animal's mouth or head, these portions 5d each having an upwardly extending projection 5e. It will be seen that the projections 5e form respectively, with the projections 5b, slots 5f. These slots will be disposed at the sides of the upper portion of the mouth of the animal and the bit 15 of a bridle may extend through these slots. The reins 16 can thus pass to the rear outside of the guard. Straps 9 are attached to the projections 5e and extend upwardly therefrom, the same being secured to rings 10 at their upper ends. Another strap 11 is secured at its ends to rings 10 and extends around the front of the animal's head. Another strap 12 extends from the central portion of strap 11 to which it is secured, downwardly at the front of the animal's head and is secured at its lower end to the front central portion of portion 5c, the same being shown as extending below portion 5c.

The device as described forms a unit which can be applied to the animal's head as illustrated in Fig. 1 and be secured to a bridle or halter worn by the animal. In Fig. 1 the device is illustrated as being held on the animal's head by straps 13 secured to the rings 10 and extending over the top of the head, said straps being adjustably connected by a buckle 14 carried by one of the same. Strap 13 may form a portion of the bridle on the animal. The device will ordinarily be placed on the animal when it is wearing a bridle or is harnessed. The portions 5a, 5b, and 5c protect the under part of the animal's mouth and prevent the flies from striking or stinging the animal from underneath.

The projection 5b extends quite a distance upwardly at the under part of the rear jaw and affords good protection. Any moisture entering the device, such as the slobbers of the horse, will drain through the opening 8. The nostrils of the animal are disposed at the front of the side portions 5d, so there will be no interference with the breathing of the animal. From the above description it is seen that applicant has provided a very simple and efficient guard for the lips or mouth of an animal, such as a horse. The device is easily and inexpensively made and can be easily and quickly applied. The same has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:

1. A guard for protecting the lips and lower jaw of an animal from insects comprising, a bag-like member made of two similar but oppositely disposed pieces of sheet material, such as leather, said pieces being joined by a seam extending along a central longitudinal line, the side portions and the front and rear portions of said member converging substantially to a point located on said seam, said member having a single drain hole substantially at said point and having projections extending upwardly at each side and a projection extending upwardly from its rear side adapted to over-lie the lower jaw of the animal, said member having slots formed between said rear projection and the projections at the sides through which the bit of a bridle may extend, and supporting means for said device secured to said projections at the sides.

2. A guard for protecting the lips and lower jaw of an animal from insects comprising a bag-like member made of two similar but oppositely disposed pieces of sheet material, said pieces being joined by a seam extending along a central longitudinal line, the side portions and the front and rear portions of said member converging substantially to a point located adjacent said seam, said member having a drain hole substantially at said point and having projections extending upwardly one at each side and a projection extending upwardly and rearwardly from its rear side, said last mentioned projection being adapted to overlie the lower jaw of the animal, and supporting means for said device secured to said projections at the sides.

In testimony whereof I affix my signature.
HENRY JOHN KAEHLER.